(12) United States Patent
Ratakonda

(10) Patent No.: US 6,459,459 B1
(45) Date of Patent: Oct. 1, 2002

(54) METHOD FOR DETECTING TRANSITIONS IN SAMPLED DIGITAL VIDEO SEQUENCES

(75) Inventor: Krishna Ratakonda, Urbana, IL (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/004,058

(22) Filed: Jan. 7, 1998

(51) Int. Cl.⁷ ................................................. H04N 5/14
(52) U.S. Cl. ........................................ 348/700; 348/722
(58) Field of Search ................................. 348/700, 722, 348/595, 699, 180, 184; 382/239

(56) References Cited

U.S. PATENT DOCUMENTS

| | | | |
|---|---|---|---|
| 4,223,351 A | | 9/1980 | Tsujimura et al. |
| 4,319,286 A | | 3/1982 | Hanpachern |
| 4,325,088 A | | 4/1982 | Wright |
| 5,189,463 A | | 2/1993 | Breslau et al. |
| 5,245,436 A | | 9/1993 | Alattar |
| 5,283,645 A | | 2/1994 | Alattar |
| 5,416,529 A | | 5/1995 | Lake |
| 5,544,239 A | | 8/1996 | Golin et al. |
| 5,559,562 A | * | 9/1996 | Ferster .......................... 348/584 |
| 5,835,163 A | * | 11/1998 | Cion et al. ................... 348/700 |
| 5,771,008 A | * | 6/1999 | Uz ............................... 382/239 |
| 5,911,008 A | * | 6/1999 | Niikura et al. ............... 382/236 |
| 5,959,697 A | * | 9/1999 | Coleman, Jr. ................ 348/700 |
| 6,040,875 A | * | 3/2000 | Boice ........................... 348/545 |
| 6,100,940 A | * | 8/2000 | Dieterich ..................... 348/700 |
| 6,195,458 B1 | * | 2/2001 | Warnick et al. ............. 382/173 |

FOREIGN PATENT DOCUMENTS

| | | |
|---|---|---|
| EP | 0 555 873 A2 | 8/1993 |
| EP | 0 555 874 A2 | 8/1993 |

OTHER PUBLICATIONS

Aigrain et al., The Automatic Real–Time Analysis Of Film Editing And Transition Effects And Its Applications, Computer & Graphics, vol. 18, No.1, pp93–103 (1994).

B. Shahraray, *Scene change detection and content–based sampling of video sequences*, Proc. of SPIE, vol. 2419, pp 2–13, Feb. 7, 1995.

Yeo et al., *A Unified approach to temporal segmentation of motion JPEG and MPEG compressed video*, Proc. of Int. Conf. on Multimedia Computing and Systems, pp. 81–88, IEEE, May 15, 1995.

* cited by examiner

Primary Examiner—Victor R. Kostak
(74) Attorney, Agent, or Firm—Robert D. Varitz, P.C.

(57) ABSTRACT

A method of detecting transitions in a video sequence includes inputting a digital video sequence into a video processor; detecting a monotonically varying image intensity profile of the digital video sequence; and tagging the digital video sequence associated with such an intensity profile as a transition event.

14 Claims, 4 Drawing Sheets

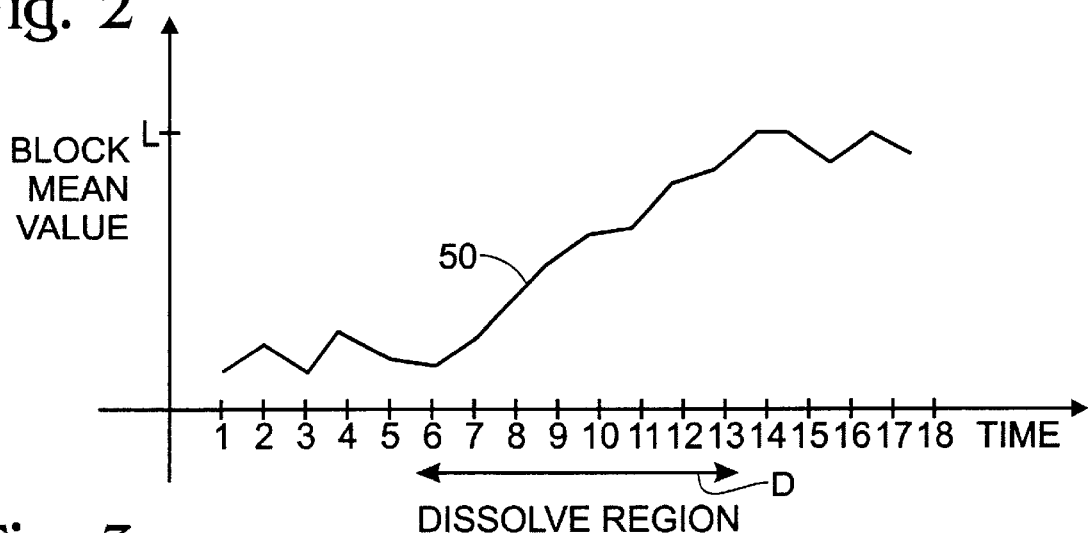
Fig. 2 — DISSOLVE REGION D
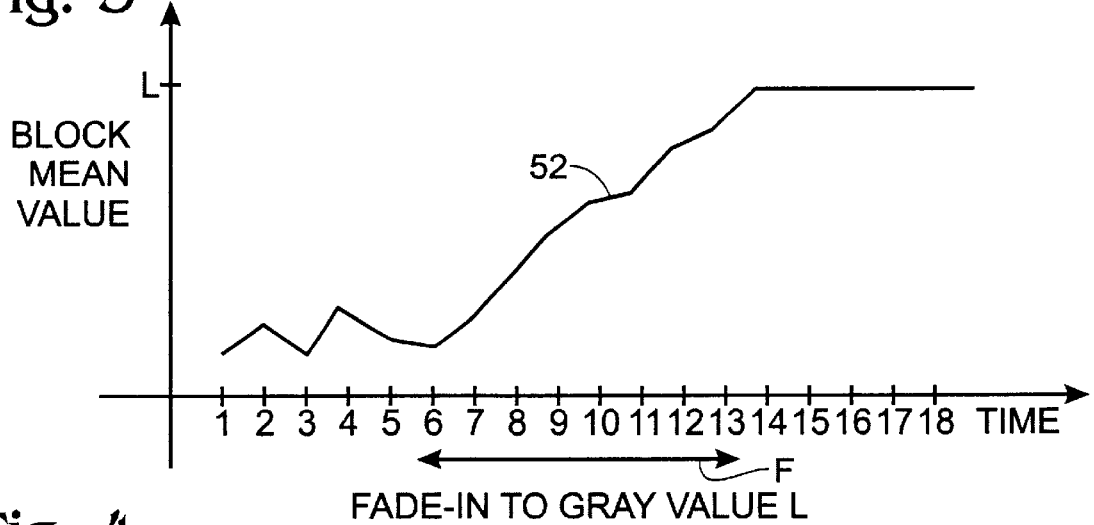
Fig. 3 — FADE-IN TO GRAY VALUE L (F)
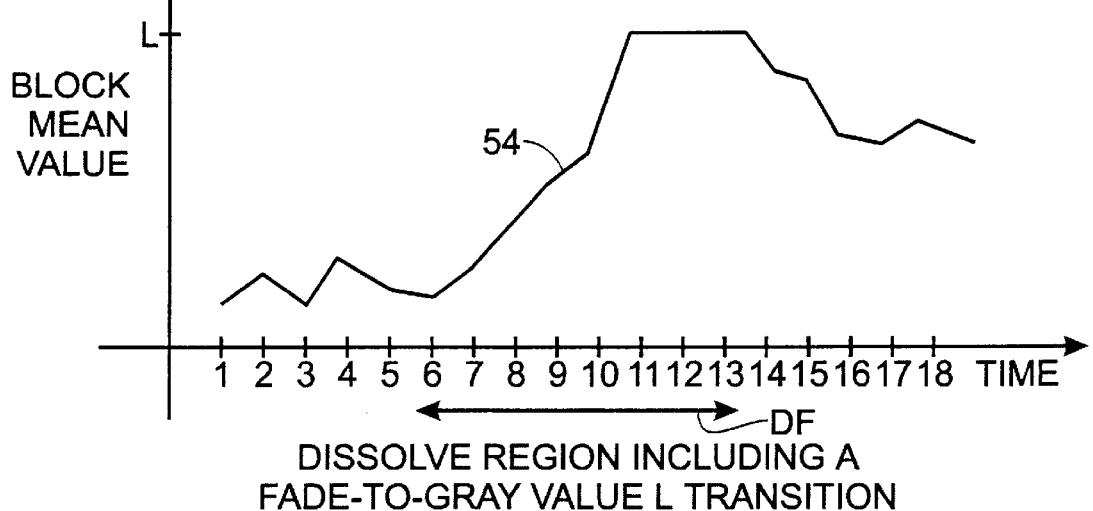
Fig. 4 — DISSOLVE REGION INCLUDING A FADE-TO-GRAY VALUE L TRANSITION (DF)

METHOD FOR DETECTING TRANSITIONS IN SAMPLED DIGITAL VIDEO SEQUENCES

RELATED PATENT

U.S. Pat. No. 5,956,076, granted Sep. 21, 1999, for "System and Method for Hierarchical Summarization and Browsing," of Krishna Ratakonda.

FIELD OF THE INVENTION

This invention relates to detecting either transitions in digital video sequences, wherein the transitions include dissolves, fades, and dissolves including fades.

BACKGROUND OF THE INVENTION

A transitions is a special visual effect that softens an abrupt scene change in a video sequence. Dissolve transitions are periods of time where the content of a video sequence gradually changes from one scene to another usually according a pre-defined pattern in time. It is of common occurrence in professional footage and consumer video shot by advanced users of high-end cameras. Within a dissolve region, the next scene appears (fades in) while the first scene fades out, and by the end of the dissolve region the next scene replaces the first. Dissolves may also occur as a combination of a fade out to a blank screen followed by a fade in to the second scene. Dissolve regions may be of varying duration, from 1 sec. in professional videos to about 6 sec. in videos shot by recently available digital camcorders, such as Sharp® ViewCam®, model VL-DC1.

The purpose of detecting dissolve and fade transitions is to pre-process uncompressed or compressed digital video sequences prior to preparing a video summary, which will enable a user quickly to review a number of video sequences, or during editing, to avoid undesirable effects such as detection of spurious keyframes by video editing/indexing systems during a dissolve or a fade. Such spurious keyframes have little value in video summaries.

Fades are generally a transition between a scene and a given color, usually black or white. A fade region is called a fade-in when the transition goes from a fixed color to a video scene and it is called a fade-out when the transition goes from a video scene to a fixed color. Color, as used herein, includes black and white. Dissolve transitions may include a intermediary fade-to-white, fade-to-black or fade-to-gray phase. The first and the last image in a dissolve or a fade transition are called "anchor frames." The video scenes in the dissolve or fade transition may feature either static or moving content.

The known prior art is generally concerned with detecting dissolve and fade regions in a statistical setting. Furthermore, the prior art cited below does not make any references to the capability to work directly in a compressed video domain. Previous work in this area typically assumes a model for the dissolve i.e., a model for the variation in the image intensities. Such work assumes that a dissolve results in a linear change of intensities between the anchor frames, which frames are the first and last frames in the dissolve event. It may then be shown that the intermediary frames between the anchor frames have a parabolic profile in terms of standard deviation of intra-frame intensities, i.e., the plot of frame number vs. intra-frame standard deviation for intermediary frames has a parabolic profile. This profile is used as a signature to parse for a dissolve in the video sequence. However, it may be noted that this profile may occur in other parts of the sequence not associated with a dissolve. In order to remove such spurious dissolve detections, known techniques limit the maximum duration of a dissolve to under one second. This artificial limitation may not be satisfied in practice. Additionally, the linear model may not be always satisfied. A dissolve obtained from a camcorder, such as Sharp® ViewCam®, model VL-DC1, is typically piece-wise linear. Analog camcorders, which use capacitive circuitry, may produce a different profile of a dissolve altogether because capacitance changes exponentially.

Aigrain et al, "The Automatic Real-Time Analysis of Film Editing and Transition Effects and its Applications," Computer and Graphics, Vol. 18, No. 1, pp 93–103 (1994) propose statistical models for detecting cross-dissolves, fade-in's and fade-out's. These models are built on the assumption that the transitions are linear. The case where a fade-to-gray transition is part of a dissolve transition is not considered.

U.S. Pat. No. 4,319,286, to Hanpachern describes circuitry which detects a temporary loss of video and audio signals. The patent describes a "commercial killer" which captures the rapid fade-to-black transition that occurs before a commercial in continuous, non-sampled, digital video signals.

U.S. Pat. Nos. 5,245,436 and 5,283,645, both to Alattar, describe sampled digital video inputs. U.S. Pat. No. 5,283,645 describes a statistical framework for detecting dissolves. The proposed method assumes that the dissolve transition is linear in time. U.S. Pat. No. 5,245,436 describes a mechanism for detecting fade-in's, transition from a solid color like black to a moving video scene, or fade-out's, transition from moving video scene to a solid color like black, based on measuring the mean difference and the relative mean change between consecutive video frames. The decision whether a fade occurs or not is made on a frame by frame basis and relies on comparing the overall image mean value variation against a set of pre-defined values.

SUMMARY OF THE INVENTION

A method of detecting transitions in a video sequence includes inputting a digital video sequence into a video processor; detecting a monotonically varying image intensity profile of the digital video sequence; and tagging the digital video sequence associated with such an intensity profile as a transition event.

The invention is a method for detecting a dissolve which overcomes most of the difficulties in the known prior art. The method is independent of the model adapted for dissolve creation and is more resistant to spurious dissolves. The method is also resistant to limited motion within the dissolve sequence.

An object of the invention is to provide a new technique for detecting a dissolve event in a video sequence.

Another object of the invention is to provide a new technique for detecting a dissolve event in a video sequence that is functional with both uncompressed digital video and DCT-based compressed video, such as JPEG and MPEG.

Another object of the invention is to provide a new technique for detecting a dissolve event in a video sequence that is functional with MPEG-2 compressed video, and wherein dissolve event detection is performed with minimal decoding of the MPEG-2 compressed bitstream.

Another object of the invention is to provide a new technique for detecting a dissolve event in a video sequence that provides accurate dissolve/fade detection in the presence of noise.

It is an object of the invention is to provide a new technique for detecting a dissolve event in a video sequence that is insensitive to scene motion.

A further object of the invention is to provide a unified, fast and yet, robust method for detecting dissolve events, including fade-in's and fade out's, in sampled digital video sequences.

Yet another object of the invention is to provide such detection capability independently from the mechanisms or the models used to generate the dissolve events.

BRIEF DESCRIPTION OF THE DRAWINGS

FIG. 2 is a graph of block mean value variations in a pure dissolve region.

FIG. 3 is a graph of block mean value variations in a pure fade region.

FIG. 4 is a graph of block mean value variations in a dissolve region which includes a fade transition.

DETAILED DESCRIPTION OF THE PREFERRED EMBODIMENT

Figure 1:
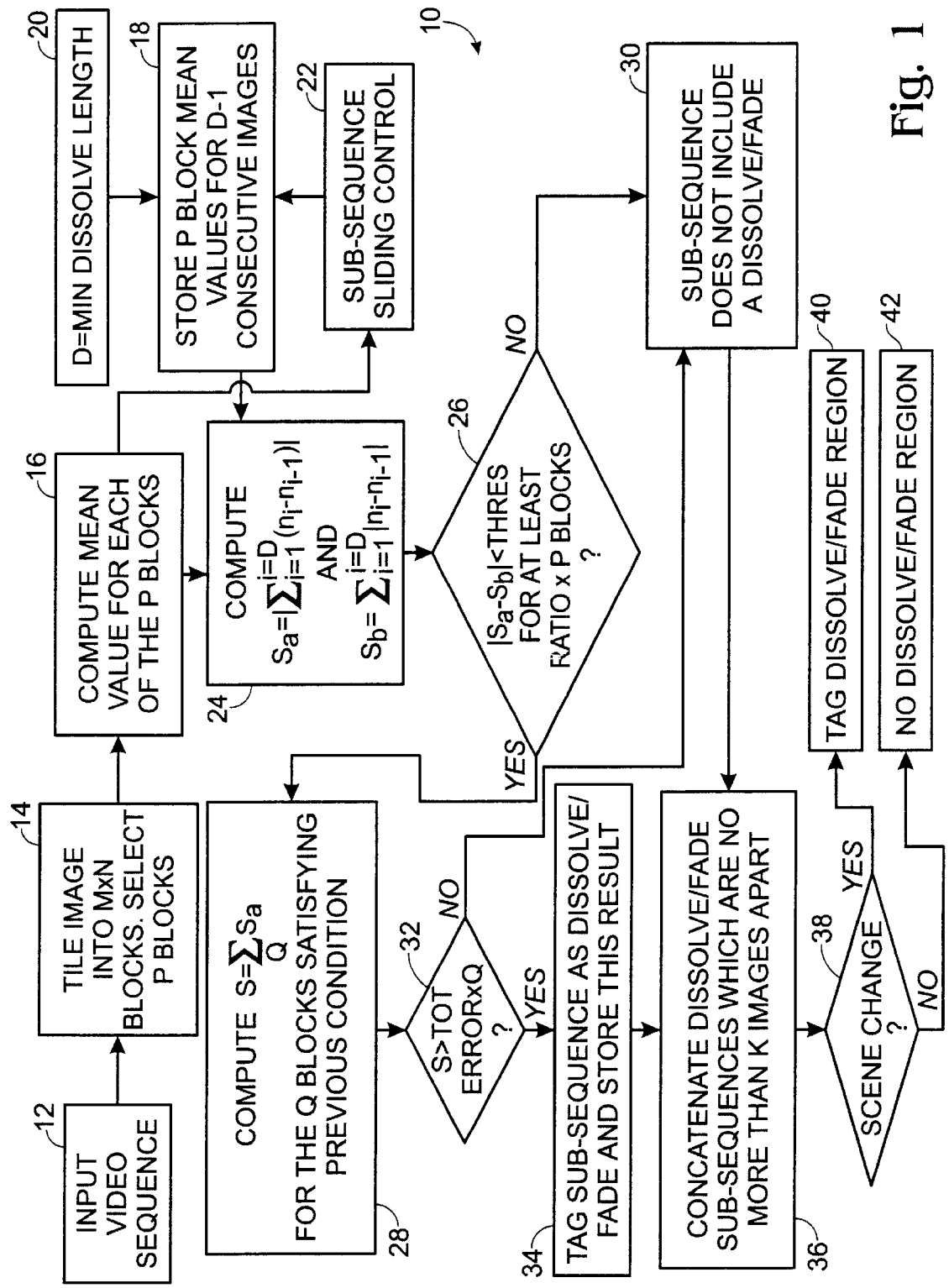
FIG. 1 is a flow chart depicting a first embodiment of the method of the invention

The method of the invention provides a robust technique for detecting a dissolve event, regardless of whether the video input stream is compressed or uncompressed, regardless of scene motion or signal noise, and which method overcomes most of the difficulties in the known prior art. The method is independent of the model adapted for dissolve creation and more resistant to spurious dissolves. The method is also resistant to limited motion within the dissolve sequence. The invention described herein works when the input video sequence is either a sampled video (uncompressed or decompressed) or JPEG or MPEG-compressed video sequence.

Detecting dissolves, also referred to herein as a dissolve event, is among the key pre-processing steps to many digital video applications such as video indexing, video editing and video compression. In video summarization, as described in my granted patent cited above, dissolves may result in detection of spurious keyframes, between the anchor frames, unless they are detected and excluded from video summarization. As used herein, the first and last images in a dissolve sequence are termed "anchor frames." In video compression, motion compensated predictive compression may be avoided by appropriate selection of compression modes within dissolve regions in order to avoid possible decrease in compression efficiency due to poor prediction.

In the case of compressed video, such as video compressed under a MPEG standard, loss in coding efficiency in a video encoder may be due to the use of motion compensated prediction in the dissolve region. In general, loss of coding efficiency leads to blocking artifacts in the video sequence because the bit budget per video frame is limited. Once a dissolve has been detected in a digital video sequence, steps may be taken during compression to prevent the effects mentioned above.

The invention may be implemented within a video camera which either records sampled video sequences or compressed video bitstreams, or may be implemented in a video editing suite, such as a PC, or other computer. As used herein, the term "video processor" includes video cameras, edit suites, computers, or any other device used to manipulate digital video according to the method of the invention. In the case of a camera or camcorder, the locations of the dissolve or fade regions may be stored in memory. The method of the invention may be implemented as a preprocessing stage before computation of video summaries. The dissolve/fade detection results may be utilized by the video summary module to avoid spurious keyframes which might have been detected in dissolve or fade regions.

In order to detect a dissolve event in digital video, the key distinguishing feature of any dissolve sequence must be identified. Consider the profile of the grey value of a pixel at a particular position in all the intermediary frames. From the definition of a dissolve, it follows that the profile will be a monotonic curve, i.e., one that only increases or stays constant, or only decreases or stays constant, as the independent variable, i.e., time, varies across intermediary frames. This is independent of any model assumed for dissolve creation and incorporates even a spatially varying model, i.e., a model which varies across the frame. If all the pixels between two frames follow the monotonic profile, then there has to be a dissolve between the two frames, excluding the trivial case of constant frames and assuming strict monotonicity. This double implication, i.e., profile<=>dissolve, clearly suggests that if such a profile is present in a sequence of video frames, the profile will be the best possible indication of a dissolve event. This forms the basis of the method of the invention for dissolve event detection: detecting a monotonically varying image intensity profile for a digital video sequence, and tagging a digital video sequence as a transition event iff the sequence has a monotonically varying image intensity profile. As used herein, transition events include dissolves, fades and dissolves including fades.

The method of the invention is depicted in the flow chart set forth in FIG. 1, generally at 10. The method is based on monitoring the mean values of M×N (M≧1, N>1) image blocks in time. In the presence of a dissolve or a fade, the variations of these mean values are monotonic as shown in FIGS. 2, 3 and 4. Monotonicity in the variations of the image block mean value is therefore the basic criterion utilized in this invention to detect dissolves or fades. Strict monotonicity occurs when absolute values of the mean variations (differences) are strictly greater than zero.

Assume that a space-varying model for the profile of the dissolve varies from pixel to pixel, for example, f(t, i, j), where t represents the temporal dimension and i, j are indices into the image. Given two pixel values, L(i,j) and M(i,j), co-located at (i,j) but residing at different frames in time, the "profile function" f(t,i,j) describes how the value L(i,j) transitions to become M(i,j), in time, due to a fade-in or fade-out (i.e., L fades in (or out) to M). For instance, in FIG. 3, the value at i,j at time 6 (say M) fades in to value L, and the (monotonic) transition is expressed by f(t,i,j). Given that the space varying model for the dissolve is approximately constant within the block (i.e., f(t, i, j) may be replaced by f(t, B) for a block B), the mean of the block, when tracked across the intermediary frames will have a monotonic profile. Assume that the profile for the dissolve between frames L and M, for the block (B) is:

$$g(t,i,j) = (L(i,j) - M(i,j)) f(t,B)) \tag{1}$$

where f(. , .) is the normalized monotonic profile for the dissolve between the frames L and M, the anchor frames. It may be easily seen that if f(. , .) is only a function of the block (and does not vary with the pixels within the block), the mean profile of the block (B) is:

$$g_B(t) = \left( \sum_B \left( \frac{L(i,j)}{V} \right) - \sum_B \left( \frac{M(i,j)}{V} \right) \right) f(t, B) \quad (2)$$

where V is the number of pixels within block B. In Eqs. (1) and (2), L and M denote pixel intensity distributions of two frames located at two time instances. The index i,j runs within a particular image block B. Because f is the same for pixels within the block, the notation f(t,B) is used. Now, apply the "mean operation" to the first equation, i.e., sum each quantity over the block B and divide the result by N. Since f(t,B) is assumed constant, it survives and appears outside. The result is Eq. (2), where the relationship for the "block mean," whose profile is again the same, namely f(t,B), is defined. Therefore, the block means have the same profile if the pixels within the block have this same profile.

From then on, the mean values of blocks are the representative features of the video frames that are used in detection of fades and dissolves. One other advantage of using means, in addition to the three described below, is the fact that it makes the process insensitive to camera motion or motion of the individual objects in the scene, as well as noise. This is very important as it makes for a robust method.

Thus, according to Eqs. (1) and (2), the mean profile of the block is therefore also monotonic. Note that if f(. , .) is not the same within the block, the mean profile need not be monotonic. It is also to be noted that f(. , .) must be the same for pixels within a given block. Two different blocks may have different normalized monotonic profiles. Using the mean profile of a block instead of individual pixel profiles is advantageous for the following reasons:

1. Individual pixels may be prone to noise and might not yield a monotonic profile. The effect of noise is reduced in the mean profile due to the inherent integration over all the pixels in the block.
2. Mean profile of a block may be easily obtained from an MPEG-2 bitstream with limited decoding (in the case that we want to perform dissolve detection directly on MPEG-2 bitstreams), thus saving on computational time.
3. Tracking mean profiles reduces the dimension of the computation (since the number of points to be tracked is reduced) in tracking the profile.

As previously noted, a monotonic sequence is indicative of a dissolve event. In order to verify that a given sequence of numbers $n_i$, i=1 . . . D is monotonic, the values of $S_a$ and $S_b$ may be analyzed. Consider the two values $S_a$ and $S_b$ obtained by:

$$S_a = |\Sigma_{i=1}^{i=D}(n_i - n_{i-1})| \quad (3)$$

$$S_b = \Sigma_{i=1}^{i=D}|n_i - n_{i-1}| \quad (4)$$

It is evident that $S_a$ and $S_b$ are only equal iff the sequence is monotonic. In order to ensure strict monotonicity $S_a$ (or $S_b$) must be greater than a small value, as will be described later herein.

In the preferred embodiment of the invention, the image blocks are horizontal "stripes", wherein height=8 rows (M=8) and width equal to the image width N. The "means" therefore reduces to the "row" averaging. The reason for using rows is two fold: (1) row averaging may be done with minimal decoding when directly processing an MPEG video bitstream, i.e., there is no need to decode the video first, as explained later herein; and (2) the motion during fades/dissolves is likely to have a larger horizontal motion component than a vertical motion component, because horizontal motion is, generally, higher in a typical video sequence. If vertical blocks were used, the procedure may work, however, problems of "mismatch" in case of severe horizontal motion are more likely. Further, using image blocks rather than pixels provides accurate detection of dissolve/fade in the presence of noise making the method robust in practice.

Referring now to FIG. 1, the first embodiment of the method of the invention will be described in a step-by-step manner.

Step 1: Split a sampled input digital video sequence, block 12, such as a video frame or a video field, as such image appears in a camcorder or editing suite, into plural, non-overlapping M×N blocks, block 14. A number P of these blocks is retained for subsequent processing. "P" is the number of blocks to be used in further processing of the image. As previously noted, the steps of the method of the invention may take place in a camcorder, computer, or other video editing suite, and may take place during a video summarization or editing process.

Step 2: Compute the mean value of each of the P blocks, block 16. The resulting P mean values along with their corresponding values in the previous MIN_DISSOLVE_LENGTH-1 images are stored, block 18, and used to evaluate the monotonicity of the mean values in time. The value MIN_DISSOLVE_LENGTH (also referred to herein as "D"), block 20, determines the length of the image sub-sequence used to measure monotonicity, block 22. This is a estimated value, and is provided as an input parameter by the user, based on an expected minimum length of a dissolve event.

Step 3: Evaluate monotonicity of the mean values by calculating the two quantities $S_a$ and $S_b$ for each of the P image blocks, block 24. These values are equal if the mean values in the sub-sequence exhibits a monotonic trend.

Step 4: Compare absolute difference of $S_a$ and $S_b$ against a pre-defined threshold value, THRES, for each of the P image blocks, block 26. The number of blocks, Q, showing an absolute difference less than THRES, is compared to a given image count RATIO×P where RATIO is an input parameter. The value RATIO is a value between 0.0 and 1.0, and a typical value for RATIO is in a range of between 0.6 and 0.9. The monotonicity condition is satisfied if Q is greater than RATIO×P, which means that there are at least RATIO×P mean values which exhibit a monotonic trend.

Step 5: If the monotonicity condition in step 4 is satisfied, compute S defined as the sum of $S_a$ quantities found for the Q mean values satisfying the condition in step 4, block 28. In the case where condition of step 4 has failed, the sub-sequence is tagged as not being part of a dissolve or a fade, block 30. Go to step 7.

Step 6: Compare the value S against the value TOT_ERROR×Q, block 32. If S is greater than TOT_ERROR×Q, the sub-sequence is tagged as belonging to a dissolve or fade region, block 34. This test ensures strict monotonicity in the mean value variations. If S is smaller or equal to TOT_ERROR×Q, the sub-sequence is tagged as not being part of a dissolve or a fade transition, block 30. Go to step 7.

Step 7: Re-iterate step 1 through 7 for all sub-sequences in the digital video sequence. A sub-sequence sliding control mechanism determines the position of consecutive sub-sequences in the sequence. One possibility consists in sliding the sub-sequence by one frame at a time, block 22. In this case, the oldest mean values are discarded and are replaced by the P mean values obtained from the last input video image. Another possibility is to increment the position of consecutive sub-sequences by more than one frame at a time.

Step 8: Inspect all sub-sequence tags. Eliminate spurious (isolated) dissolve/fade sub-sequences and concatenate dissolve/fade sub-sequences which are no more than K images apart, where K is a pre-defined number of images, block 36. This step involves changing negative dissolve/fade tags to positive dissolve/fade sub-sequence identification as long as they occur between dissolve/fade sub-sequences detected within a K images range. All other regions in the sequence are otherwise tagged as not being dissolve/fade regions Step 9: Verify that there is a scene change between the two anchor frames of the detected dissolve/fade region, block 38. This step guarantees that sequences of still images cannot be detected as dissolve or fade regions. A possible implementation is to test whether the absolute difference of the block mean values in the two anchor frames exceeds a pre-defined threshold.

Step 10: Tag period in video sequence as a dissolve/fade transition if test in step 9 is true, block 40. Tag it as not being a dissolve/fade region otherwise, block 42.

The value of P, i.e., the number of blocks to be used in processing is chosen as follows: Frames are tiled into contiguous blocks, covering the entire image, however, not all of the frames may be used for dissolve detection. P may be equal to the total number of blocks in the image, in the case where all blocks are used, or less than the total number of blocks. The first option is the usual mode of operation, whereas the second option is a provision to (1) reduce computational cost, especially when frames are large, say 1920×1080 pixels, particularly if computational resources are limited, and (2) to incorporate a priori knowledge one may have, or which one may extract from the video data, about the scene. For instance for (2), if one detects motion in a region spanning a certain subset of blocks, e.g., due to an independently moving object, such blocks may be left out, allowing the subsequent process to focus on only variations that are due to fade or dissolve, rather than object motion. In addition, any blocks containing channel errors (e.g., transmission errors) are also left out.

The difference between detecting either dissolve regions, fade regions or dissolve regions with intermediary fade transition lies in the selection of the MIN_DISSOLVE_LENGTH, TOT_ERROR and K values.

The value of MIN_DISSOLVE_LENGTH determines the image sub-sequence length thereby impacting the selectivity of the algorithm as far as locating the anchor frames is concerned. For dissolve regions which include an intermediary fade transition, the value MIN_DISSOLVE_LENGTH should be selected greater than the number of constant color images to prevent strict monotonicity test from failing too frequently. A typical value for MIN_DISSOLVE_LENGTH is 30.

The value TOT_ERROR determines the degree of monotonicity in the sequence. In detection of fades, the value of TOT_ERROR is decreased to take into account the fact that monotonicity measure, $S_a$, is either zero or close to zero in the regions where the video images are constant (beginning of fade-in or end of fade-out). A typical value for TOT_ERROR is 6, for processing 8 bits per pixel luminance component of the video sequence. In the case of dissolve regions including a fade transition, the value TOT_ERROR is decreased if the value MIN_DISSOLVE_LENGTH is small so the algorithm does not fail in the region of constant color. $S_a$ and $S_b$, as used herein, are quantities used to determine whether the set of numbers $n_i$ are monotonic or not. $S_a$ and $S_b$ are intermediate values used to define the monotonicity test described herein.

The value of K is selected in coordination with the values selected for MIN_DISSOLVE_LENGTH and TOT_ERROR. In the case of fades, a large K value may help compensate for a MIN_DISSOLVE_LENGTH which is too small or for a TOT_ERROR which is too large. For pure dissolves, a small value may prevent the algorithm from extending dissolve region beyond the anchor frames.

FIGS. 2, 3 and 4 provide three distinct scenarios for dissolves and fades. FIG. 2 provides a typical example of block mean value variations, line 50, in a pure dissolve region, line "D" Variations of the mean outside the dissolve region reflect the fact that image content is moving in each scene.

FIG. 3 provides a typical example of block mean value variations, line 52, in a pure fade region, line "F". The difference from the transition depicted in FIG. 2 lies in the fact that this transition brings the image content to a pre-defined constant value, L.

FIG. 4 provides a typical example of block mean value variations, line 54, in a dissolve region which includes a fade transition, line "DF". The difference from the transition depicted in FIG. 2 lies in the fact that in this transition there is an intermediary fade to constant value, L, in the dissolve. Digital camcorders such as the Sharp® ViewCam®, model VL-DC1 operate according to this mode.

The method described above may be ported to the case where the input digital video sequence is replaced by a compressed video stream, where compression is block DCT-based, such as motion JPEG- or an MPEG-compressed bitstream. As already described in my cited co-pending application, which is incorporated herein by reference, DC values of 8×8 blocks may be obtained from MPEG bit-streams with minimal decoding and may be readily used in compiling row averages. In the case of MPEG, the dimensions, M and N, are integer multiple of 8, which are now values imposed by the coding standard and no longer input parameters as in FIG. 1.

Figure 5:
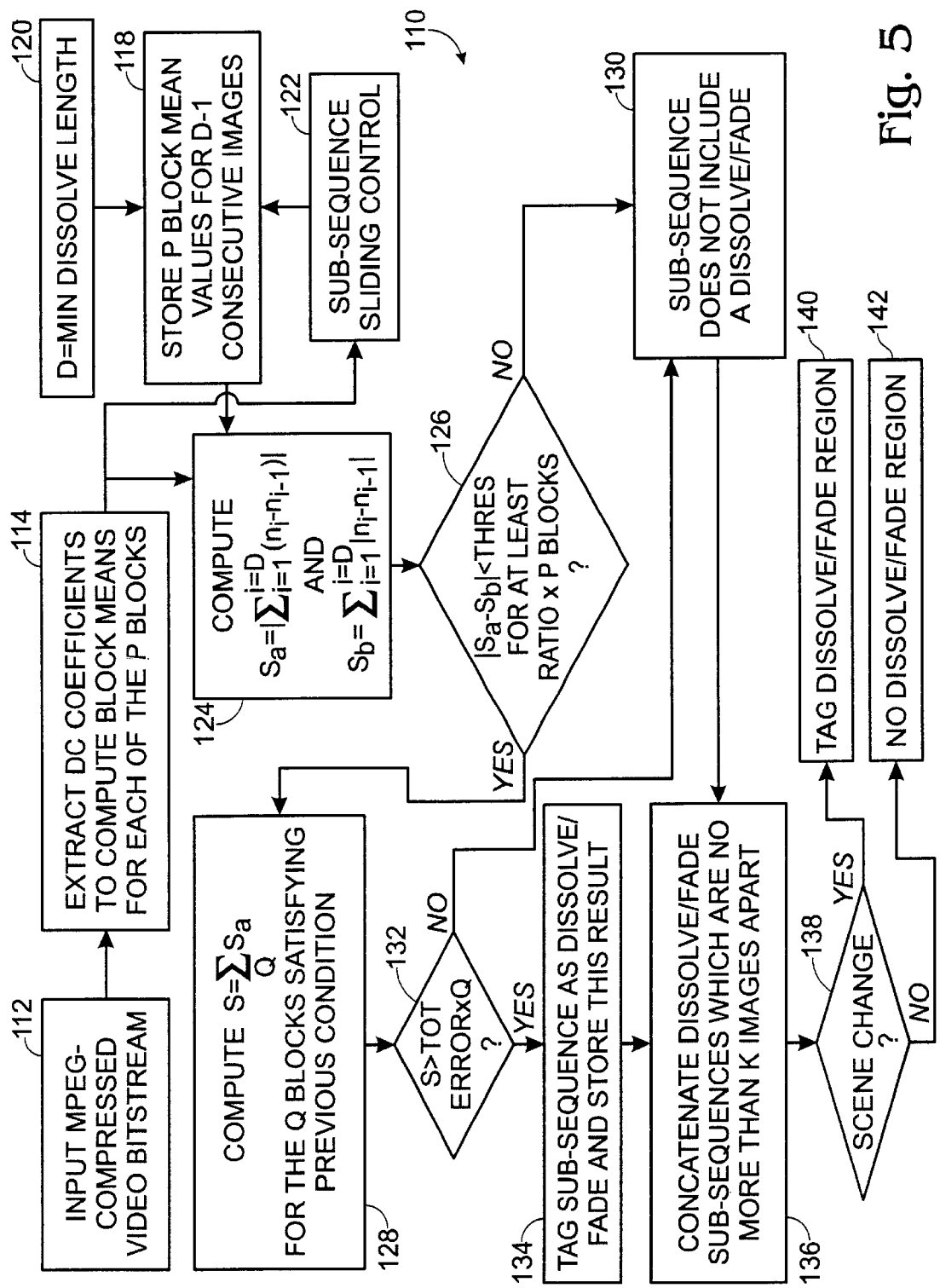
FIG. 5 is a flow chart depicting a second embodiment of the method of the invention.

FIG. 5 shows a revision of FIG. 1 when the input is an MPEG-compressed video bitstream.

Step 1: Minimally decode an input MPEG compressed video bitstream, block 112, and extract the DC coefficients to compute the means of P blocks of M×N, block 114, which number P is retained for subsequent processing. As previously noted, the steps of the method of the invention will take place in a camcorder, computer, or other video editing suite, and will take place during a video summarization or editing process.

Step 2: The resulting P mean values along with their corresponding values in the previous MIN_DISSOLVE_LENGTH-1 images are stored, block 118, and used to evaluate the monotonicity of the mean values in time. The value MIN_DISSOLVE_LENGTH, also referred to herein as "D", block 120, determines the length of the image sub-sequence used to measure monotonicity, block 122. As stated with the uncompressed input method, this is a estimated value, and is provided as an input parameter by the user, based on an expected minimum length of a dissolve event.

Step 3: Evaluate monotonicity of the mean values by calculating the two quantities $S_a$ and $S_b$ for each of the P image blocks, block 124. These values are equal if the mean values in the sub-sequence exhibits a monotonic trend.

Step 4: Compare absolute difference of S and $S_b$ against a pre-defined threshold value, THRES, for each of the P image blocks, block 126. The number of blocks showing an absolute difference less than THRES, Q, is compared to a given image count RATIO×P where RATIO is an input parameter. The value RATIO is a value between 0.0 and 1.0, and a typical value for RATIO is in a range of 0.6 to 0.9. The monotonicity condition is satisfied if Q is greater than RATIO×P, which means that there are at least RATIO×P mean values which exhibit a monotonic trend.

Step 5: If the condition in step 4 is satisfied, compute S defined as the sum of $S_a$ quantities found for the Q mean values satisfying the condition in step 4, block 128. In the case where condition of step 4 has failed, the sub-sequence is tagged as not being part of a dissolve or a fade, block 130. Go to step 7.

Step 6: Compare the value S against the value TOT_ERROR×Q, block 132. If S is greater than TOT_ERROR×Q, the sub-sequence is tagged as belonging to a dissolve or fade region, block 134. This test ensures strict monotonicity in the mean value variations. If S is smaller or equal to TOT_ERROR×Q, the sub-sequence is tagged as not being part of a dissolve or a fade transition, block 130. Go to step 7.

Step 7: Re-iterate step 1 through 7 for all sub-sequences in the digital video sequence. A sub-sequence sliding control mechanism determines the position of consecutive sub-sequences in the sequence. One possibility consists in sliding the sub-sequence by one frame at a time, block 122. In this case, the oldest mean values are s discarded and are replaced by the P mean values obtained from the last input video image. Another possibility is to increment the position of consecutive sub-sequences by more than one frame at a time.

Step 8: Inspect all sub-sequence tags. Eliminate spurious (isolated) dissolve/fade sub-sequences and concatenate dissolve/fade sub-sequences which are no more than K images apart, where K is a pre-defined number of images, block 136. This step involves changing negative dissolve/fade tags to positive dissolve/fade sub-sequence identification as long as they occur between dissolve/fade sub-sequences detected within a K images range. All other regions in the sequence are otherwise tagged as not being dissolve/fade regions.

Step 9: Verify that there is a scene change between the two anchor frames of the detected dissolve/fade region, block 138. This step guarantees that sequences of still images cannot be detected as dissolve or fade regions. A possible implementation is to test whether the absolute difference of the block mean values in the two anchor frames exceeds a pre-defined threshold.

Step 10: Tag period in video sequence as a dissolve/fade transition if test in step 9 is true, block 140. Tag it as not being a dissolve/fade region otherwise, block 142.

Figure 6:
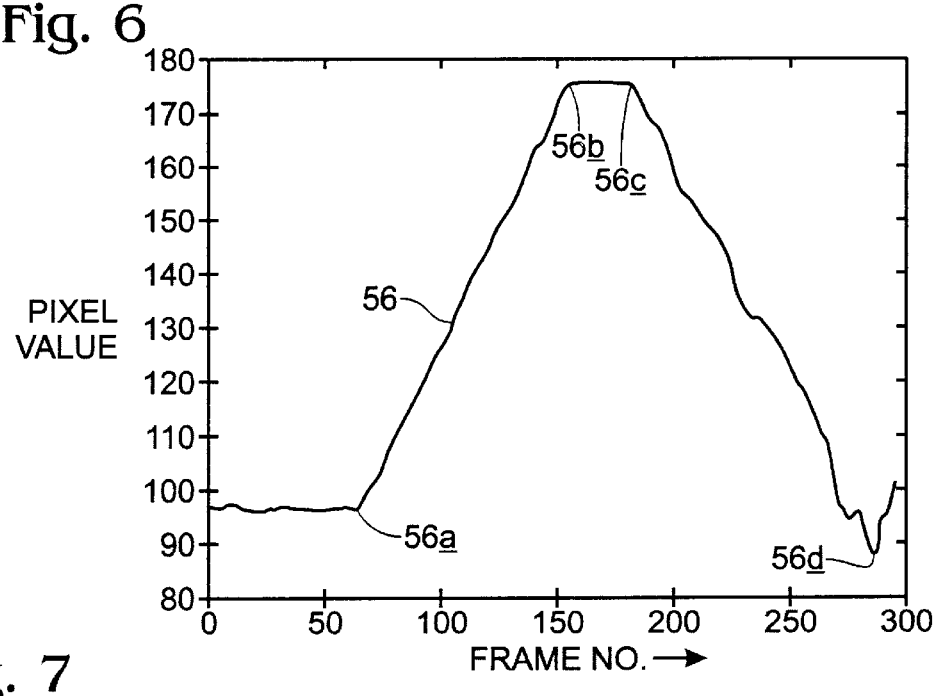
FIG. 6 is a graph of a pixel profile.

FIG. 6 shows the typical profile, line 56, of a pixel undergoing a fade out followed by a fade in (the second category of dissolve introduced in the introduction). This profile was obtained from an actual dissolve taken with a Sharp® ViewCam®, model VL-DC1. It may also be noted that the dissolve (i.e., fade in +fade out) lasts for over 6 seconds (30 frames/second), contrary to assumptions made in the prior art. The fade out event begins at 56a, and is complete at 56b. The image is of constant intensity until 56c, when a fade in event begins, which fade in event is complete at 56d.

Figure 7:
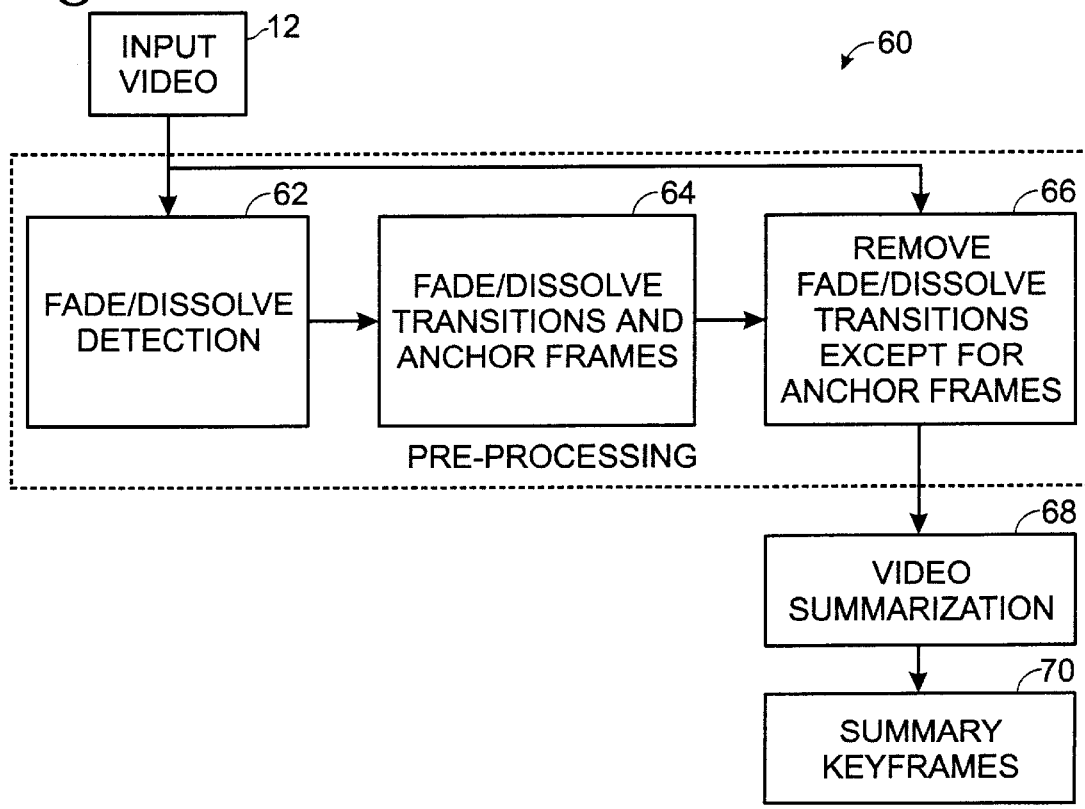
FIG. 7 is a block diagram of the pre-processing steps of the method of the invention.

Referring now to FIG. 7, a pre-processing step 60, which may be used with the method shown in either FIG. 1 or FIG. 5, is depicted. An input video sequence 12 is provided. If the input video contains dissolves, certain frames within the transition region may be detected as keyframes of the video summary, using the video summarization method of my co-pending application. These detected frames within the transition region, however, are of little value as keyframes. Such spurious keyframes are avoided as the video sequence is pre-processed according to the current invention, where dissolves and fades are detected, block 62, and only their anchor frames, block 64, are used in the summarization process block 68, after removing and detected fade/dissolve transitions that are not anchor frames, block 66, resulting in a more meaningful summary keyframes, block 70.

INDUSTRIAL APPLICATIONS

In video browsing, dissolve events result in a number of keyframes being assigned to the dissolve region, which is not a desirable condition. The keyframes contain a number of frames from the dissolve event which might be "uninteresting" to the user. By removing the dissolve frames from the video sequence before feeding it to the keyframe detection mechanism, the identification of uninteresting frames may be avoided, thereby converting a dissolve into an abrupt scene transition.

Compression algorithms which employ motion compensation strategies perform very poorly in dealing with dissolve events. A possible implementation, after identifying a dissolve, will compress only the anchor frames and transmit the normalized monotonic profile (f(t,B)) to represent the rest of the frames. If the monotonic profile is approximated by a linear fit, no parameters need be sent because the start and end points are already known. The MPEG decoder will be able to reconstruct the entire dissolve sequence with this information.

The methods of the invention may be used as a pre-processing module in JPEG or MPEG encoders. When a dissolve or a fade is positively identified in a video sequence, an encoder may make a smart selection of encoding parameters to maintain coding efficiency in the dissolve/fade regions.

Thus, a method of detecting transition events in a digital video sequence has been disclosed. The method is useful as part of a regimen prior to video summarization or editing. The method may be used with compressed or uncompressed video sequences, and, where used with compressed video sequences, only requires partial decompressing of the video bitstream. Although a two embodiments of the invention have been disclosed herein, it will be appreciated that further variations and modifications may be made thereto without departing from the scope of the invention as defined in the appended claims.

I claim:

1. A method of detecting transitions in a video sequence comprising:
    inputting a digital video sequence into a video processor;
    identifying a transition event, including:
        detecting a monotonically varying image intensity profile of the digital video sequence; and
        tagging the digital video sequence associated with such an intensity profile as a transition event; and
    eliminating the transition event except for transition event anchor frames prior to identifying keyframes.

2. The method of claim 1 wherein transition events are taken from the group consisting of dissolves, fades, and dissolves including fades.

3. The method of claim 1 wherein said detecting includes detecting image intensity profiles of M×N image blocks where M≧1 and N≧1.

4. The method of claim 1 wherein said inputting includes inputting an uncompressed digital video sequence.

5. The method of claim 1 wherein said inputting includes inputting a compressed digital video sequence, wherein the compressed digital video sequence is taken from the group of compressed digital video sequence including MPEG and JPEG compressed digital video sequence.

6. The method of claim 1 wherein said eliminating the transition event except for transition event anchor frames prior to identifying keyframes includes pre-processing the digital video sequence to eliminate the transition event except for transition event anchor frames prior to identifying keyframes.

7. The method of claim 1 which includes:
(a) splitting the digital video sequence into plural, non-overlapping image blocks;
(b) processing a number, P, of the image blocks;
(c) determining the mean value of each of the P image blocks in a sub-sequence of frames;
(d) determining the length of the sub-sequence of frames required to measure monotonicity by from a minimum expected length of a dissolve event;
(e) calculating a pair of monotonicity values, $S_a$ and $S_b$, for each of the P image blocks; evaluating the monotonicity of the mean value of each of the P image blocks;
(f) determining a pre-defined threshold value (THRESH) for a monotonicity test;
(g) comparing an absolute difference of the pair of monotonicity values against the pre-defined threshold value for each of the P image blocks;
(h) selecting those image blocks, whose number is Q, wherein the absolute difference is less than THRESH;
(i) comparing Q to a given image count RATIO×P, wherein RATIO is an input parameter having a value between 0.0 and 1.0, to test for a monotonic trend;
(j) calculate a monotonicity value, S, defined as the sum of $S_a$ quantities found for the Q image blocks;
(k) tagging those Q image blocks wherein the monotonicity value S is greater than the value TOT_ERROR×Q as an image block belonging to a dissolve or fade region;
(l) using a sub-sequence sliding control mechanism to consider all sub-sequences in the input video;
(m) concatenating image sub-sequences which are tagged as belonging to a dissolve or fade region and are no more than K images apart, where K is a pre-defined number of frames; and
(n) verifying that there is a scene change between the two anchor frames of the detected dissolve/fade region.

8. The method of claim 7 wherein said determining (c) includes extracting the DC coefficient of a DCT block from a compressed input digital video sequence.

9. A method for detecting transitions in digital video sequences comprising:

(a) inputting a digital video sequence into a video processor;
(b) splitting the digital video sequence into plural, non-overlapping image blocks;
(c) processing a number, P, of the image blocks;
(d) determining the mean value of each of the P image blocks in a sub-sequence of frames;
(e) determining the length of the sub-sequence of frames required to measure monotonicity from a minimum expected length of a dissolve event;
(f) calculating a pair of monotonicity values, $S_a$ and $S_b$, for each of the P image blocks; evaluating the monotonicity of the mean value of each of the P image blocks;
(g) determining a pre-defined threshold value (THRESH) for a monotonicity test;
(h) comparing an absolute difference of the pair of monotonicity values against the pre-defined threshold value for each of the P image blocks;
(i) selecting those image blocks, whose number is Q, wherein the absolute difference is less than THRESH;
(j) comparing Q to a given image count RATIO×P, wherein RATIO is an input parameter having a value between 0.0 and 1.0, to test for a monotonic trend;
(k) calculate a monotonicity value, S, defined as the sum of $S_a$ quantities found for the Q image blocks;
(l) tagging those Q image blocks wherein the monotonicity value S is greater than the value TOT_ERROR×Q as an image block belonging to a dissolve or fade region;
(M) using a sub-sequence sliding control mechanism to consider all sub-sequences in the input video;
(n) concatenating image sub-sequences which are tagged as belonging to a dissolve or fade region and are no more than K images apart, where K is a pre-defined number of frames;
(o) verifying that there is a scene change between the two anchor frames of the detected dissolve/fade region; and
(p) tagging a video sequence as a dissolve/fade transition.

10. The method of claim 9 wherein transition events are taken from the group consisting of dissolves, fades, and dissolves including fades.

11. The method of claim 9 wherein said inputting includes inputting an uncompressed digital video sequence.

12. The method of claim 9 wherein said inputting includes inputting a compressed digital video sequence, wherein the compressed digital video sequence is taken from the group of compressed digital video sequence including MPEG and JPEG compressed digital video sequence.

13. The method of claim 9 wherein said determining (d) includes extracting the DC coefficient of a DCT block from a compressed input digital video sequence.

14. The method of claim 9 which includes identifying a transistion event and pre-processing the digital video sequence to eliminate the transition event except for transition event anchor frames prior to identifying keyframes.

* * * * *